US012567445B2

(12) United States Patent
Rashid et al.

(10) Patent No.: US 12,567,445 B2
(45) Date of Patent: Mar. 3, 2026

(54) VIDEO REMIXING METHOD

(71) Applicant: Lemon Inc., Grand Cayman (KY)

(72) Inventors: Imran Rashid, London (GB); Jordan Smith, London (GB); Fraser Smith, London (GB); Will Hawkins, London (GB); Edmund Philip Newton-Rex, London (GB)

(73) Assignee: LEMON INC., Grand Cayman (KY)

( * ) Notice: Subject to any disclaimer, the term of this patent is extended or adjusted under 35 U.S.C. 154(b) by 27 days.

(21) Appl. No.: 18/562,230

(22) PCT Filed: May 23, 2022

(86) PCT No.: PCT/SG2022/050342
§ 371 (c)(1),
(2) Date: Nov. 17, 2023

(87) PCT Pub. No.: WO2022/255941
PCT Pub. Date: Dec. 8, 2022

(65) Prior Publication Data
US 2024/0242736 A1      Jul. 18, 2024

(30) Foreign Application Priority Data

Jun. 3, 2021      (EP) ..................................... 21177649

(51) Int. Cl.
*G11B 27/031*          (2006.01)
(52) U.S. Cl.
CPC .................................. *G11B 27/031* (2013.01)

(58) Field of Classification Search
None
See application file for complete search history.

(56) References Cited

U.S. PATENT DOCUMENTS

| | | | | |
|---|---|---|---|---|
| 10,726,872 B1 * | 7/2020 | Boyd | ..................... | G06V 20/49 |
| 11,190,726 B1 * | 11/2021 | Oulès | ..................... | H04N 5/76 |
| 11,689,692 B2 * | 6/2023 | Oules | ..................... | H04N 5/783 |
| | | | | 386/343 |
| 11,769,528 B2 * | 9/2023 | Patterson | ............. | G11B 27/031 |
| | | | | 386/278 |
| 2007/0109446 A1 * | 5/2007 | Jeong | .................. | G06F 16/7834 |
| 2009/0150781 A1 * | 6/2009 | Iampietro | ............. | G11B 27/28 |
| | | | | 84/611 |

(Continued)

FOREIGN PATENT DOCUMENTS

WO          2014001607 A1      1/2014

OTHER PUBLICATIONS

International Search Report in PCT/SG2022/050342, mailed Aug. 12, 2022, 3 pages.

(Continued)

*Primary Examiner* — Gelek W Topgyal
(74) *Attorney, Agent, or Firm* — Astute IP Law Group

(57) ABSTRACT

The present invention relates to method for generating a video remix, the method comprising: receiving an input video; selecting at least one excerpt from the input video, wherein an audio signal of the selected excerpt includes at least one onset; determining a plurality of sub-sequences of the at least one excerpt; and rearranging the plurality of sub-sequences according to a predetermined pattern to form the video remix.

17 Claims, 9 Drawing Sheets

(56) References Cited

U.S. PATENT DOCUMENTS

| 2014/0229831 | A1* | 8/2014 | Chordia | G11B 27/031 |
| | | | | 715/717 |
| 2016/0104045 | A1* | 4/2016 | Cho | H04N 21/4394 |
| | | | | 386/223 |
| 2019/0037230 | A1* | 1/2019 | Pandit | H04N 19/70 |
| 2019/0289327 | A1* | 9/2019 | Lin | G06N 3/0464 |
| 2020/0117909 | A1* | 4/2020 | Noel | G11B 27/031 |
| 2021/0210119 | A1* | 7/2021 | Jia | G06V 40/10 |
| 2022/0312048 | A1* | 9/2022 | Chen | H04N 21/44016 |

OTHER PUBLICATIONS

Extended European Search Report in EP,21177649.7 mailed Dec. 3, 2021, 8 pages.
Tutvid: "5 Speed, Stutter, & Reverse Video Intro Effects in Premiere Pro", Aug. 3, 2017, XP055861680, Retrieved from the Internet: URL:https://www.youtube.com/watch?v=4G0WgtANZg, 2 pages.

* cited by examiner

*FIG. 2a*
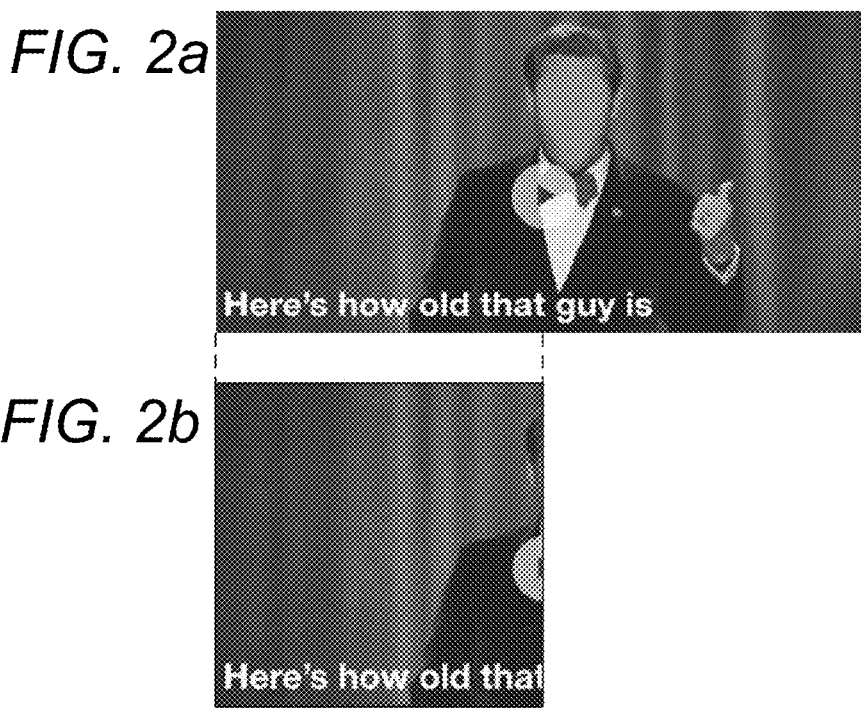
*FIG. 2b*
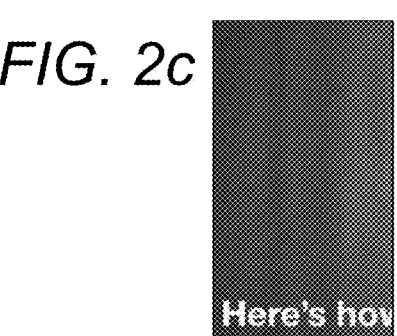
*FIG. 2c*
*FIG. 2d*

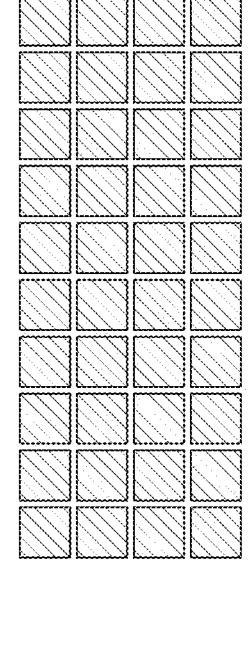
*FIG. 6b*
*FIG. 6d*
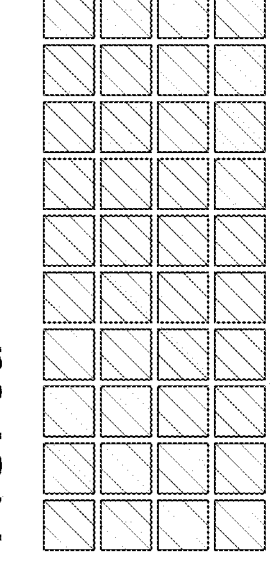
*FIG. 6a*
*FIG. 6c*
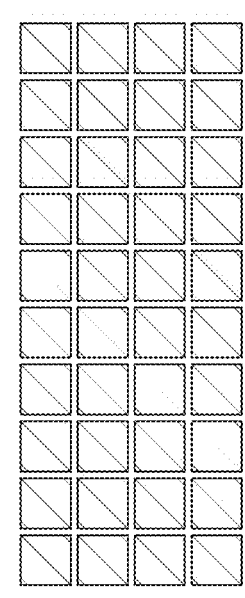

VIDEO REMIXING METHOD

CROSS-REFERENCE TO RELATED APPLICATIONS

This application is a national stage application filed under 35 U.S.C. 371 based on International Patent Application No. PCT/SG2022/050342, filed May 23, 2022, which claims priority to EP Application Serial No. 21177649.7, filed Jun. 3, 2021, and titled "VIDEO REMIXING METHOD", the disclosures of which are incorporated herein by reference in their entities.

The present invention is in the field of video editing.

BACKGROUND

Generally, a (music) remix is a rearrangement of an older piece of music. A video remix is a rearrangement of a previously recorded video or parts of it. Thus, video remixing is a video editing application in which multiple video segments are combined in order to obtain a video remix. Video remixing is building upon a work that already exists and using it to make new meanings and express new ideas in creative ways. However, editing a video can be difficult and tedious, so it is desirable to produce technologies to aid people in this task.

Video editing is the manipulation and arrangement of video previously recorded video or parts of it. Video editing is used to structure and present video information and has been dramatically democratized in recent years by editing software available for personal computers. Software allowing users to create short videos, which often feature music in the background and can be sped up, slowed down or edited with a filter is currently enjoying great popularity. To create a music video, users can choose background music from a variety of music genres or sound recordings and record a short video with speed adjustments. Thus, a video clip that matches a selected audio track can be created by hand.

Turning a previously recorded video into a musical video or musical remix typically requires video editing steps like cutting and synchronizing the relative timing of audio (sound) and video (image) parts as well as merging additional background music to the video clip. This often poses a problem to users not having experience in designing musical remixes, like those being unable to manually align each part by ear, which is particularly time-consuming. Automatic video remixing using user-generated or professional recordings is desirable as it opens up video mixing to a broader audience of amateurs and reduces the time it takes to produce a remixed video.

In view of the limitations of the prior art, the technical problem underlying the present invention may be seen in the provision of a method for automatically creating a video remix from an original video. Therefore, a more convenient video remixing method is needed that is easy in handling and presents a fast way to edit video for a user.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present invention relates to automatic video remixing. In particular, the present disclosure provides a method for video remix generation, wherein a source video is automatically cut into precisely measured sub-sequences based on the audio information of the source video that are rearranged into a video remix. The repetition of the audio information in the video remix makes the audio sound musical, i.e. the remix has a rhythm. As a result the created video remix is pleasing to the ear of many users, which is encouraging to many users to try the method on several of their own videos.

In a first aspect, the present disclosure provides a method for generating a video remix, the method comprising the steps of receiving an input video; selecting at least one excerpt from the input video, wherein an audio signal of the selected at least one excerpt includes at least one onset; determining a plurality of sub-sequences of the at least one excerpt; and rearranging the plurality of sub-sequences according to a predetermined pattern to form the video remix.

First, the terminology used to describe the video data and editing concepts will be explained.

A video (clip) is a sequence of images called frames and typically includes audio. An input video or source video may be captured by a high quality camera of a portable device, such as mobile phones, cameras or tablets. The device recording the input video may share the recorded source content with the device responsible for generating the video remix. A video remix is a rearrangement of a previously recorded video or part of it. A multi-clip video remix is a rearrangement of at least two previously recorded videos or two parts of the same video.

An excerpt is a sequence of frames selected from the original input video for the video remix. Typically, an excerpt is a piece of a predetermined length of the input video which is taken/extracted from the larger input video. A sub-sequence is a sequence of frames within the (video) excerpt. A sub-sequence can be the whole or part of the excerpt. A specific order or arrangement of a plurality of sub-sequences is referred to as a pattern. A pattern can specify a song structure and may correspond to a specific song layout. A pattern is typically divided into "chunks" each comprising a plurality of sub-sequences. A pattern may provide repeating forms in songs.

An "onset" in an audio signal refers to the beginning of a musical note or other sound, both of which may be present in an audio signal. Techniques for detection of onsets and their strengths are known in the art. More than one such technique may be used and their results may be combined. One technique may be performed using an audio signal processing library. For example the "librosa" python package may be used which includes an onset_strength attribute. Another technique may use the constant-Q transform "CQT", in which the data series is transformed into the frequency domain, and the librosa package may be used for this. In signal processing, onset detection is a well-known research area. Music onset detection may refer to detection of the instant when a discrete event begins in e.g. a music signal.

By selecting an excerpt of an input video based on its onsets, a salient video clip can be determined automatically.

Rearranging a plurality of sub-sequences of such excerpt including at least one onset in a predetermined rhythmic pattern allows to repeat the at least one onset throughout the video remix in a predictable or periodic manner. This allows the automation of video remix creation. For example, a person's footsteps can be turned into a drum-like rhythm. The repetition of the at least one onset imparts a rhythm to the created video remix, in the sense of the placement of sounds in time. At the same time the video image part corresponding to the onset is repeated in the video remix making the video remix salient.

The present invention is based on the finding that a video remix can be automatically created when paying attention to the onsets in the audio signal of the input video. Depending on the predetermined pattern, a rhythm is imparted to the video remix which makes it easy to implement further automated video editing, like e.g. adding background music. The conversion of videos to video remixes according to the present invention may allow users to create salient video clips without having experience in designing musical remixes.

The at least one excerpt may have a predetermined length, wherein each sub-sequence may have a length corresponding to a divisor of the predetermined length, and the video remix may have a length corresponding to a multiple of the predetermined length. This allows the creation of video remix based on input videos of every size/length, wherein independent of the size of the input video the resulting video remix has always the same size/length. Therefore, video remixes with similar patterns can be created from different input videos. This is particularly, useful when it comes to adding musical backing tracks to the video remix. The length of the sub-sequences is smaller or equal to the size of the excerpt and the final video remix is typically longer the predetermined length of the excerpt. Therefore, the video remix may contain a high number of repetitions of sub-sequences. The length of the sub-sequences can be chosen to be e.g. 1, ½, ¼, ⅛, 1/16 etc. of the excerpt. This allows to combine a high number of (different) sub-sequences while still matching the predetermined length.

The at least one excerpt may begin with the at least one onset. In other words, the excerpt is selected such that its audio track begins with the at least one onset, wherein an increase in loudness associated with this onset may be particularly high. In this case even very short sub-sequences e.g. corresponding to only ⅛ of the excerpt still include the at least one onset. Thereby it is ensured that the part of the video that contains the at least one onset has a high number of repetitions in the resulting video remix. Generally, the excerpt should not be quiet but chosen such that it has a high density of onsets.

The method can include detecting the at least one onset by applying an onset detection function to the input video. Techniques for detection of onsets and their strengths are known in the art. More than one such technique may be used and their results may be combined. An onset detection function may be applied using an audio signal processing library. The onsets can be calculated with a third-party library, librosa, wherein the algorithm involves a peak detection from a spectral envelope of the signal and then backtracks from peaks to their proceeding local minima. Based on the detected onsets, the moments/points in the excerpts are identified that include an onset. An onsets may corresponds to a moment when e.g. a batter hits a baseball, or other events in the audio signal.

The method may include applying onset selection in cases where more than one onset in the input video is detected, wherein onset selection is based on at least one of onset strength, onset loudness and onset density. Typically, the input videos include a plurality of onsets, wherein each onset has a different strength and/or loudness. The excerpt of a predetermined length should be chosen such that it contains a high number of detected onsets, the onsets with the highest strength or the onsets with maximum loudness or a combination of all three factors. In videos with speech, these criteria have been found sufficient to select excerpts with speech. It is also possible that a user selects one of these options in view of a particular input video. When the number of onsets in the input video is too high, a threshold can be implemented such that only onsets with a certain loudness of strength are considered as onsets for selection of the excerpt.

When determining the plurality of sub-sequences, the excerpt may be chopped into sub-sequences, wherein a majority of the sub-sequences includes the at least one onset. Once the excerpt is selected, those sub-sequences are determined that are present in the predetermined pattern, wherein the excerpt is automatically chopped into sub-sequences according to their determined length. According to the predetermined pattern, the sub-sequences are assembled in a specific order.

When determining the plurality of sub-sequences, a loop point corresponding to an onset within the first half of the excerpt can be determined, wherein sub-sequences with a shorter length than the excerpt begin at the loop point. When an excerpt has a strong onset at a different or another point in time than at the beginning of the excerpt, it may be preferable to repeat the additional onset in the video remix. Therefore, the loop point is chosen such that it corresponds to the onset, for example a second onset in the excerpt in proximity to the first onset at the beginning of the excerpt. Since the loop point is the point in time at which the shorter sub-sequences begin, it has to be within the first half of the excerpt. By default and in cases where the excerpt only includes a single onset at the beginning of the excerpt, the loop point will be set to zero. The option of defining a loop point within the excerpt allows to create more complex video remixes including repetitions of different onsets.

The predetermined pattern may correspond to a musical backing track. In particular, it may be built in the sense that it builds to a climax. Since the pattern determines how to cut up and reassemble the sub-sequences of the excerpt, a user may chose a predetermined pattern or a specific song layout at the beginning of the video remix creation process. It is also conceivable that the predetermined pattern may be chosen randomly from a number of predetermined patterns.

To create more complex video remixes, it is possible to choose a multi-clip option to create them. It is also possible that the method automatically selects the multi-clip option for input videos that e.g. contain a number of onsets at two distinct times of the input video that cannot be combined in one excerpt. When the multi-clip option is selected, a second excerpt is selected from the input video such that an audio signal of the second excerpt includes at least one onset. The second excerpt is chosen based on the same criteria as the first excerpt. Preferably, the first and second excerpt do not overlap. The plurality of sub-sequences of the second excerpt is determined and the plurality of sub-sequences of the first and second excerpts are rearranged into the video remix according to a predetermined multi-clip pattern. The predetermined multi-clip pattern may include at least two parts in which sub-sequences of the respective excerpt are arranged.

The video remix may comprise a plurality of chunks each comprising a plurality of sub-sequences, preferably at least one chunk is repeated in the video remix. In some embodiments, it may be advantageous to repeat at least one chunk several times in the video remix or repeat it periodically throughout the video remix, so that the resulting audio sounds musical and to impart a song structure. For a multi-clip video remix, the video remix may comprise at least one chunk comprising sub-sequences from the first excerpt and at least one other chunk comprising sub-sequences from the second excerpt.

To create a musical video remix, it may be desirable to merge an (additional) audio track to the video remix, wherein the audio track corresponds to at least one of a specifically composed musical backing track matching the predetermined pattern and/or a musical backing track based on instrument tracks. Adding music not only makes the video remix more interesting, entertaining or engaging, it can also add a professional touch. This being particularly effective if the sub-sequences of the video remix are rearranged in time with the beat of the background audio track, i.e. when the audio is synced to the video. Thus, the beat of the background audio track should be chosen to match the length or a divisor of the length of the shortest sub-sequence present in the predetermined pattern. A user may select a special background music to generate the video remix, in which case the method will automatically chose a predetermined pattern matching said background music and vice versa. By giving a user several options to choose from different instrument tracks, a background music may be designed that suits a specific music genre.

Alternatively or additionally, a backing track may be generated from sounds from the source video and added to the video remix. For example, the backing track may include a combination of the audio signal of a subsequence of the excerpt and silence(s).

Although the method for generating a video remix may be fully automatic, at least some of the parameters of the method can be chosen or set by a user. It is also possible to add an element of surprise by allowing the method to choose some parameters randomly. For example, in the step of selecting at least one excerpt, the weighting between the onset strength, onset loudness and onset density could be changed so that a different excerpt is selected.

The method for generating a video remix may be implemented by a computer.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

In other aspects, the present invention relates to a data processing system comprising a processor configured to perform the method for generating a video remix, a computer program comprising instructions which, when the program is executed by a computer, cause the computer to carry out the method for generating a video remix and/or a computer-readable medium comprising instructions which, when executed by a computer cause the computer to carry out the method for generating a video remix.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 2 shows an example of four different sub-sequences determined from one excerpt;

FIG. 6 shows exemplary clip packs each including a plurality of short tracks for different instruments to be selected by a user to generate a backing track;

FIG. 8 shows an example pattern of a backing track generated from sounds from the input video a) for a chunk and b) in full.

Figure 1:
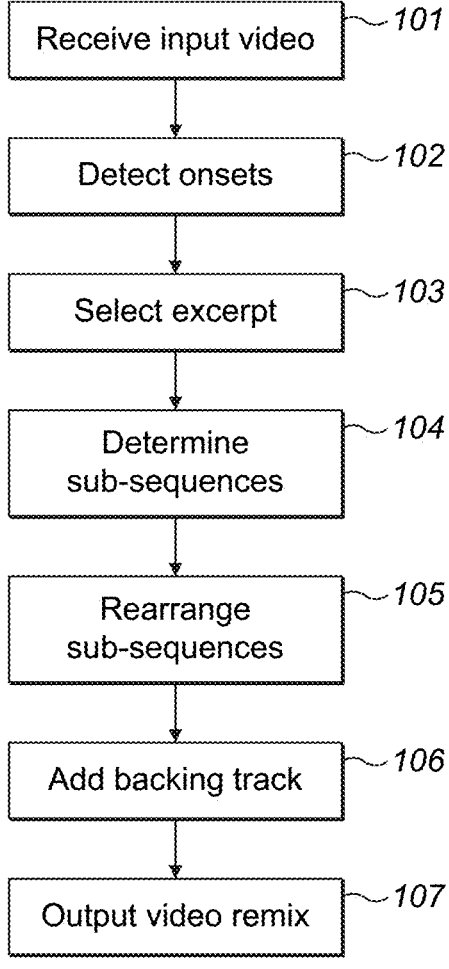
FIG. 1 is a flow chart illustrating a series of steps that may be performed in a method according to some embodiments of the invention.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 is a flow chart illustrating a method for generating a video remix. In a first step 101, an input video is received. The input video may have any size/length. The input video may be captured by a user using a portable device, such as a mobile phone, camera, tablet or the like. In the second step 102, onset detection is performed on the input video or parts of it. As set out above, audio onset detection is concerned with finding time-locations of all sonic events in a piece of audio. The audio signal of the input video typically includes a plurality of onsets. In step 103, at least one excerpt is selected based on at least one detected onset. Selecting the excerpt may include that the input video is trimmed or cut to a predetermined length such that it includes the at least one onset at the beginning or any other location within the first half of the excerpt. In the following examples, a predetermined length of the excerpt of 2 seconds (2 s) is used. However, any other predetermined length is equally suitable for generating a video remix.

Selecting the excerpt from the input video based on the detected onsets may be based on one or all of the following factors:

onset strength, e.g. size of the increase in loudness associated with the onset as determined by the applied onset detection function;

onset loudness, i.e. the loudness of the audio signal at the time of the onset; and onset density, i.e. number of onsets in a time window of a predetermined length surrounding or after the candidate onset.

As set out above, typically the audio signal includes a plurality of onsets, however, the above factors are used to determine a salient onset. An onset may be particularly "strong" the louder the sound and the quieter the preceding context. In videos with speech, these criteria have been found sufficient to select excerpts including speech.

In one example, an input video may contain four onsets, wherein three onsets are nearer to each other at the beginning (e.g. at times 1.2 s, 1.3 s and 1.7 s) and a fourth later on (at e.g. 5.4 s). The selected excerpt shall have a predetermined length of 2 s corresponding to a 2 s window of the input video. For selecting the excerpt, the onset selection algorithm considers 2 s windows beginning at each of the four detected onsets and counts the total number of onsets in each window. This results in a first window beginning at 1.2 s containing three onsets, a second window beginning at 1.3 s containing two onsets, a third window beginning at 1.7 s containing one onset and a fourth window beginning at 5.4 s containing one onset. Therefore, when the excerpt is selected based on the onset density, the first window will be chosen as the excerpt.

In step 104, a plurality of sub-sequences is determined based on the selected excerpt. In practice, this step will depend on the sub-sequences of a predetermined length included in the predetermined pattern of the desired video remix as well as the position(s) of the at least one onset(s). The repetition of the audio signal according to the predetermined pattern will make the audio sound musical. Shorter sub-sequences may begin either at the beginning of the excerpt or within the excerpt at a so called loop point. In step 105, the sub-sequences are rearranged according to the predetermined pattern to generate the video remix including audio and video. In step 106, music can optionally be added to the video remix, which is described in further detail below. In step 107, after the video remix has been generated, it can be stored or delivered to e.g. a user in any suitable manner.

The method of FIG. 1 may be carried out in any computing system. The invention may be implemented in software using one or more algorithms operating on a suitably configured processor. The steps or operations of the methods may be carried out on a single computer or in a distributed computing system across multiple locations. The software may be client based or web based, e.g. accessible via a server, or the software may be a combination of client and web based software.

FIG. 2 illustrates an example set of sub-sequences a)-d) of an excerpt. Each sub-sequence comprises a sequence of frames as indicated by the play-button and audio as indicated by the caption. All four sub-sequences have the same beginning in common, but each sub-sequence has a different length. The length of each sub-sequence corresponds to a divisor of the length of the excerpt. In other words, sub-sequences of the same length can be added up to correspond to the predetermined length of the excerpt/first sub-sequence. The length of the first sub-sequence '1' as depicted in FIG. 2a) corresponds to the full length of the excerpt. In this example, the video excerpt has a predetermined length of 2 s. The second sub-sequence '2' as depicted in FIG. 2b) corresponds to the first half of the excerpt. The third sub-sequence '3' as depicted in FIG. 2c) corresponds to the first quarter of the excerpt, the fourth sub-sequence '4' as depicted in FIG. 2d) has a length corresponding to ⅛ of the excerpt, the fifth sub-sequence '5' (not depicted) has a length corresponding to 1/16 of the excerpt and so on. The sub-sequence is indicated by its respective order number 'n', wherein the relationship between the order number and length of the sub-sequence with respect to the excerpt is given by $(\frac{1}{2})^{\wedge}(n-1)$, wherein n is an integer. In other words, a sub-sequence of the order n+1 has half the length of the sub-sequence of the order n.

Figures 3A, 3B:
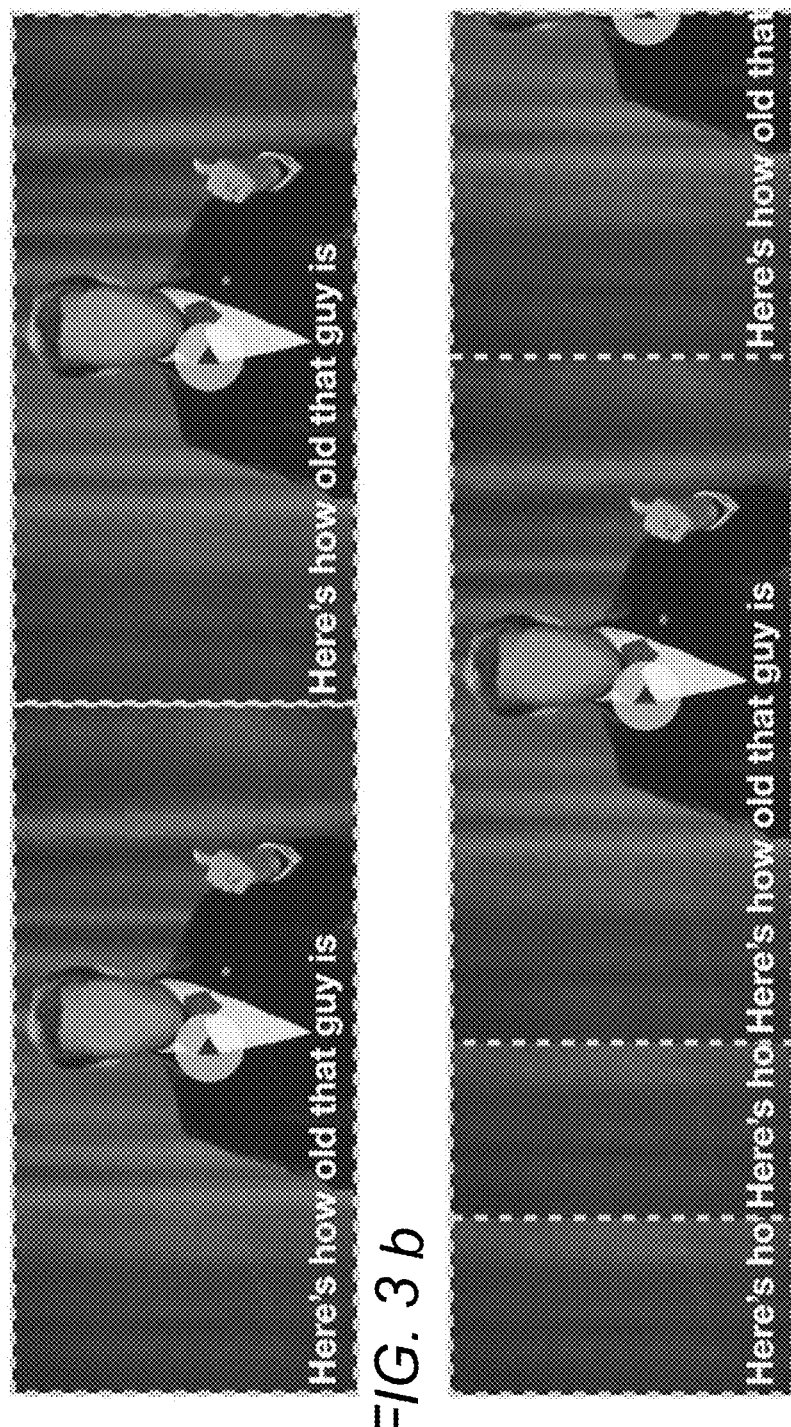
FIG. 3 shows an example of how a plurality of sub-sequences from FIG. 2 are rearranged according to a pattern.

FIG. 3 shows two example video remixes or parts of it, both of which are based on the same excerpt that is used in FIG. 2. Both video remixes are 4 s long, which corresponds to twice the length of the excerpt. Both remixes include two or more sub-sequences as indicated by the dashed vertical lines. The pattern of the video remix as depicted in FIG. 3a) can be described by '1,1' meaning that two first sub-sequence '1' is played twice and one after another without a gap. As set out above, the first sub-sequence '1' corresponds to the full excerpt. In the example as depicted in FIG. 3b), the pattern can be described by '3,3,1,2'. In this case, the video remix consists of four sub-sequences played in the order '3', '3', '1', '2'. When the video remix is played, it will show the first quarter of the excerpt twice, then a full excerpt and the first half of the excerpt. Other examples (not illustrated in FIG. 3) for rhythmic patterns with a length of 4 s are '1,2,3,3', '3,3,3,3,3,3,4,4,4,4' or '4,4,4,4,4,4,4,4,5,5, 5,5,5,5,5,6,6,6,6,6,6,6,3'.

As can be seen from the above examples, many repetitive patterns comprising a plurality of sub-sequences exist that share the same length. Patterns of a certain predefined length, like e.g. '1,1', '3,3,1,2' and '3,3,3,3,3,3,4,4,4,4' are considered chunks. Preferably, a video remix is made of a predefined number of chunks building a song structure/ layout, e.g. four chunks. In the example shown in FIG. 3, each chunk is 4 s long. A video remix with a length of 16 second includes four such chunks, wherein different sequences of the chunks may be formed like e.g. 'AAAA', 'AABA' or 'ABAB' just to name a few examples. An example of a pattern comprising four chunks in the form 'AABC' that builds up to a climax in the third chunk is provided by this example: '1,2,3,3 1,2,3,3 4,4,4,4,4,4,4,4,5, 5,5,5,5,5,5,6,6,6,6,6,6,6,3*1,2,2' wherein '3*' indicates a silence of the same length as the third sub-sequence '3'.

The short video clip that is selected as the excerpt in the examples illustrated in FIGS. 2 and 3 contains speech in the audio track in addition to visual information in the video track. The caption "Here's how old that guy is" has been included to demonstrate what cannot be heard/seen, i.e. sounds/spoken content that is important to understanding the content. It is the audio signal including the speech that is used to detect the (speech or loud nonspeech sounds) onset(s), wherein at least one onset is present marking the beginning/single instant/earliest time point at which the speech content can be detected, e.g. the beginning of a sentence.

In alternative examples, as shown in FIG. 4, two excerpts were selected from the input video (so called multi-clip option) for generating a video remix. Optionally, the excerpts 'X' and 'Y' are selected such that they do not overlap. Typically, when the multi-clip option is selected at least one of four chunks will derive from the second excerpt, e.g. the chunks have a form 'XXXY'. FIG. 4a) shows how excerpt 'X' is cut into a selection of precisely-measured sub-sequences '1', '2', '3' and '4', wherein FIG. 4b) shows the same for excerpt 'Y'. For excerpt 'X', a loop point of 0.5 has been selected, wherein for excerpt 'Y' a loop point of 0.33 has been selected. The selected loop points correspond to strong onsets in the excerpts 'X' and 'Y', respectively, as set out in detail below.

The top row in FIG. 4 shows the first sub-sequences '1' for both excerpts, which correspond to the full length of the excerpt. Independent from the selected loop point, the full excerpt is played. The second row shows the second sub-sequences '2' for both excerpts 'X' and 'Y' having an identical length corresponding to half of the original excerpts. However, the sub-sequences start at different times of the excerpt. Sub-sequence '2' of excerpt 'X' (which can also be indicated as 'X2') starts at loop point 0.5 (50%) which corresponds to the half of the video excerpt. As can be seen in FIG. 4a), the remaining sub-sequences '3' and '4' also start from the same loop point at 50% of the excerpt. Accordingly, when a loop point is selected, it is identical for all sub-sequences. For the second excerpt 'Y', the sub-sequences '2', '3' and '4' start at 33% of the video which corresponds to a loop point 0.33.

Figure 4A:
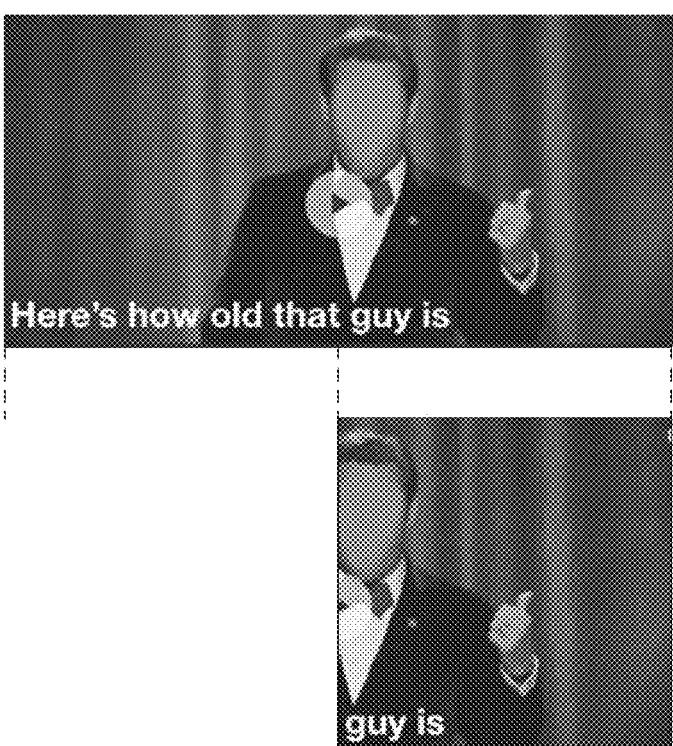
FIG. 4 shows examples of four different sub-sequences of a) a first excerpt with a first loop point and b) a second excerpt with second loop point.
Figure 4A:
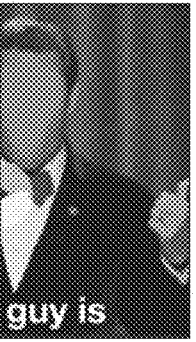
Figure 4A:
Figure 4B:
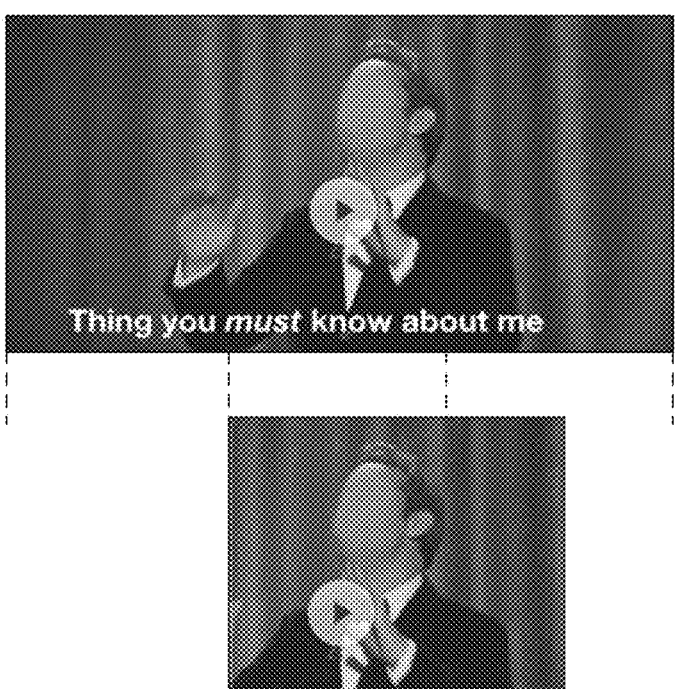
Figure 4B:
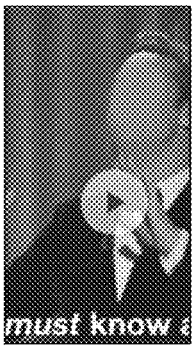
Figure 4B:

Loop points are set so as to correspond to strong onset moments of the excerpts. In a default case, in which the selected excerpt e.g. includes only one onset at the beginning, the loop point will be set to zero. However, where excerpts contain several onsets or where the onset is in the middle of the excerpts are particularly strong, loop points can be chosen accordingly. Loop points can only be chosen between 0 and 0.5, i.e. in the first half of the video. In the videos with speech as shown in FIGS. 4a and 4b, the loop points correspond to the beginning of the word sounds "guy" and "must".

Figure 5:
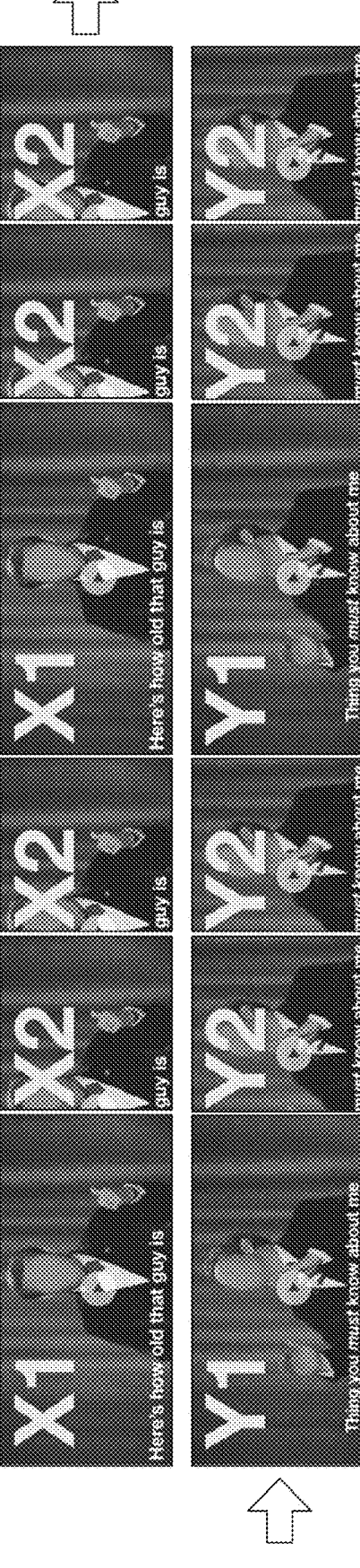
FIG. 5 shows a video remix in a multi-clip option.

FIG. 5 shows a video remix for which the multi-clip option is selected. The video remix includes the excerpts 'X' and 'Y' as depicted in FIG. 4, wherein 'X' has a loop point of 0.5 and 'Y' a loop point of 0.33. While 'X' and 'Y' refers to the respective excerpts the following numbers '1' and '2' correspond to the order of the sub-sequences as depicted in FIG. 4. In the video remix, the excerpts are arranged in a form 'XXYY', meaning that the first two chunks (top row in FIG. 5) use a different excerpt than the latter two chunks (bottom row in FIG. 5). As indicated by the arrows, the first two chunks and the second two chunks are played after another without a gap. The pattern structure of these four chunks is identical and can be described by 'AAAA'. That means that the sub-sequences of each excerpt are rearranged according to pattern '1,2,2' in each chuck. The (full) pattern of the video remix therefore corresponds to '1,2,2 1,2,2 1,2,2 1,2,2'.

The repetition of the audio signal of the excerpt (or parts of it) according to the predefined pattern makes the audio sound of the remix musical. Referring only to the speech content of the video in FIG. 5, the resulting 16 s long remix will include the following "Here's how old that guy is—guy is—guy is; Here's how old that guy is—guy is—guy is; Things you must know about me—must know about me— must know about me; Things you must know about me— must know about me—must know about me". Therefore, the predetermined pattern can be considered as a song layout that is imparted on the remix by rearranging the plurality of sub-sequences of the excerpt. In other words, audio and video is automatically generated according to a song layout.

For example, it is possible to turn a person's footsteps into a drum-like rhythm. One of the advantages of this method is, that a user only has to input a video and receives the video remix with one click.

In addition, it may be desirable to add music to the video remix to make the video remix more entertaining or engaging. However, the additional audio must be synced to the video automatically. The music can be added in form of a backing track that is generated from sounds of the input video or a fully composed backing track matching the predetermined pattern. For example, music can be selected that matches a specifically-designed predetermined pattern.

For constructing music accompaniment, a backing track can be assembled from pre-composed bits of music. In the example of FIG. 6, four exemplary clip packs a) 'EDM', b) 'OLD Skool', c) 'Hip Hop' and d) 'Retro Groove' are shown from which a user manually selected d) 'Retro Groove'. Each clip pack comprises 40 short audio tracks for four different instruments, e.g. 10 short tracks for each instrument, like e.g. Drum, Bass, Chord or Other. In the example in FIG. 6, four short tracks from different instruments are selected. The short tracks are e.g. instrument recordings that have been edited to loop seamlessly, i.e. to loop smoothly and continuously.

Figure 7:
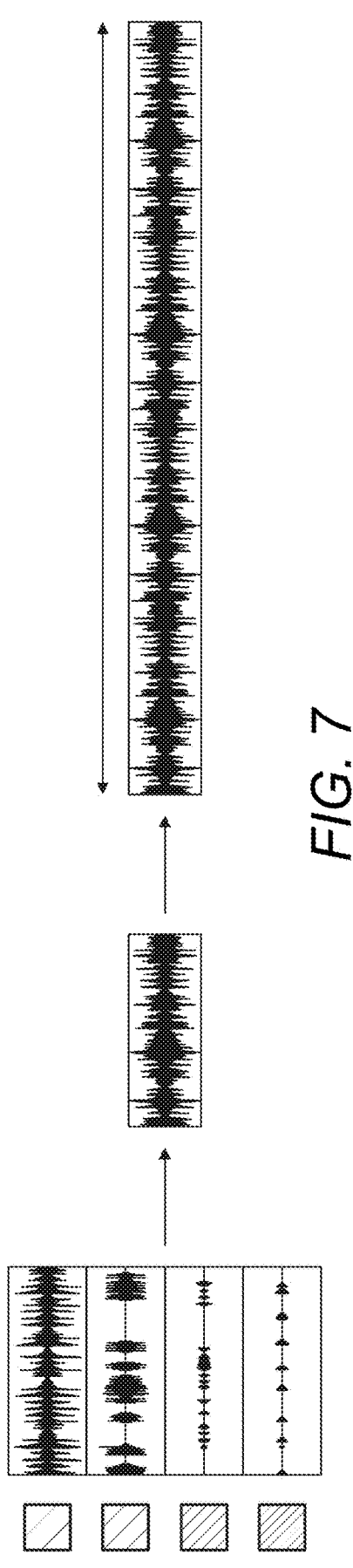
FIG. 7 shows how a backing track for a video remix is assembled based on the short tracks selected in FIG. 6.

As illustrated in FIG. 7, the four short tracks with a length of 4 s each are first summed and then repeated as many times as necessary until they match the length of the output video remix, e.g. 16 s. The backing track can then be merged with the video remix and is automatically synced with the video remix. Alternatively, a user may select a fully pre-composed audio clip. The audio clip is then merged together with the video remix to obtain the musical video remix with a length identical to the length of the video remix.

Figures 8A, 8B:
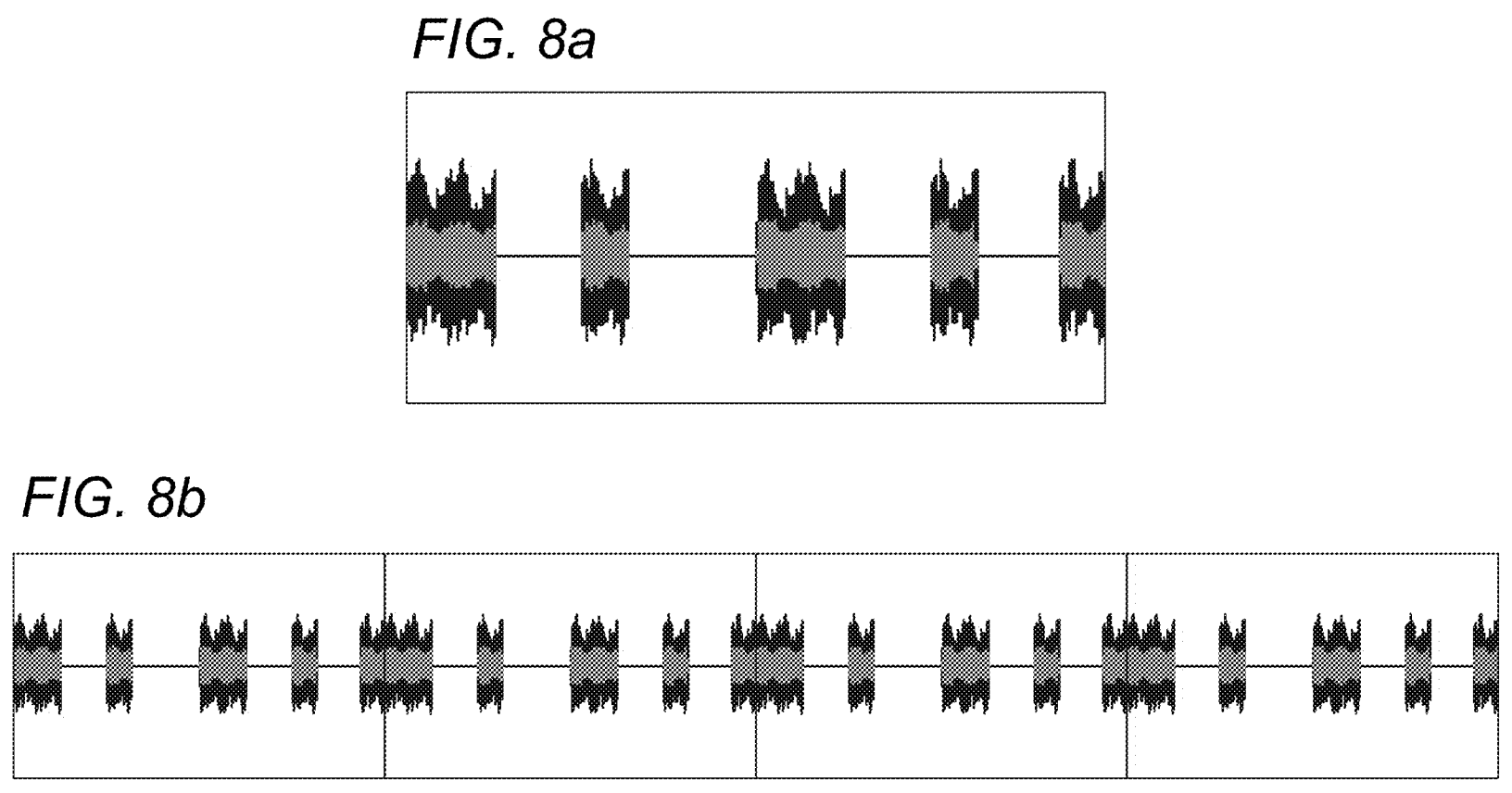

Alternatively or additionally, a backing track may be generated based on the same or a new video excerpt (using the same criteria as for selecting the excerpt from the input video as described above). FIG. 8a shows in an example of a backing track with a length of 4 s and pattern '4,4,_,_,4,_,_,_,4,4,_,_,4,_,_,4', wherein '4' refers to the fourth sub-sequences (i.e. the first ⅛ of the excerpt) and '_' to silence. After the audio is generated according to the pattern, it is repeated four times to generate the 16 s backing track depicted in FIG. 8b). This backing track can then be added to the video remix.

In the embodiment described above the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out. In some examples, the method may be designed so that each time a user inputs the same video, a different output video remix is created.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A method for generating a video remix, the method comprising:
   receiving an input video;
   selecting at least one excerpt from the input video, wherein an audio signal of the selected excerpt includes at least one onset, wherein the at least one excerpt has a predetermined length;
   determining a plurality of sub-sequences of the at least one excerpt, wherein an n-th sub-sequence of the plurality of sub-sequences has a length corresponding to an n-th divisor of the predetermined length, wherein the n-th divisor equals to the (n−1)-th power of two, and n is an integer greater than two; and
   rearranging the plurality of sub-sequences according to a predetermined pattern to form the video remix, wherein the video remix has a length corresponding to a multiple of the predetermined length.

2. The method of claim 1, wherein the at least one excerpt begins at the at least one onset.

3. The method of claim 1, wherein the method further includes:
   detecting the at least one onset by applying an onset detection function to the input video.

4. The method of claim 3, wherein the method further includes:
   applying onset selection in cases where more than one onset in the input video is detected, wherein the onset selection is based on at least one of onset strength, onset loudness and onset density.

5. The method of claim 1, wherein determining the plurality of sub-sequences includes chopping the excerpt into sub-sequences, wherein a majority of the sub-sequences includes the at least one onset.

6. The method of claim 1, wherein determining the plurality of sub-sequences includes determining a loop point corresponding to an onset within the first half of the excerpt, wherein sub-sequences with a shorter length than the excerpt begin at the loop point.

7. The method of claim 1, wherein the predetermined pattern corresponds to a musical backing track.

8. The method of claim 1, wherein the method further includes:
   selecting a second excerpt from the input video such that an audio signal of the second excerpt includes at least one onset;
   determining a plurality of sub-sequences of the second excerpt; and arranging the plurality of sub-sequences of the first and second excerpts into the video remix according to a predetermined multi-clip pattern.

9. The method of claim 1, wherein the video remix comprises a plurality of chunks each comprising a plurality of sub-sequences, preferably wherein at least one chunk is repeated in the video remix.

10. The method of claim 1, wherein the video remix comprises at least one chunk comprising sub-sequences from the first excerpt and at least one other chunk comprising sub-sequences from the second excerpt.

11. The method of claim 1, further including:
   merging an audio track to the video remix, wherein the audio track corresponds to at least one of a specifically composed musical backing track matching the predetermined pattern and/or a musical backing track based on instrument tracks.

12. The method of claim 1, further including:
   generating and adding a backing track from sounds from the input video.

13. A data processing system comprising a processor configured to perform the method comprising:
   receiving an input video;
   selecting at least one excerpt from the input video, wherein an audio signal of the selected excerpt includes at least one onset, wherein the at least one excerpt has a predetermined length;
   determining a plurality of sub-sequences of the at least one excerpt, wherein an n-th sub-sequence of the plurality of sub-sequences has a length corresponding to an n-th divisor of the predetermined length, wherein the n-th divisor equals to the (n−1)-th power of two, and n is an integer greater than two; and
   rearranging the plurality of sub-sequences according to a predetermined pattern to form the video remix, wherein the video remix has a length corresponding to a multiple of the predetermined length.

14. The data processing system of claim 13, wherein the at least one excerpt begins at the at least one onset.

15. The data processing system of claim 13, wherein the method further includes:
   detecting the at least one onset by applying an onset detection function to the input video.

16. A non-transitory computer-readable medium comprising instruction which, when executed by a computer, cause the computer to carry out the method comprising:
   receiving an input video;
   selecting at least one excerpt from the input video, wherein an audio signal of the selected excerpt includes at least one onset, wherein the at least one excerpt has a predetermined length;
   determining a plurality of sub-sequences of the at least one excerpt, wherein an n-th sub-sequence of the plurality of sub-sequences has a length corresponding to an n-th divisor of the predetermined length, wherein the n-th divisor equals to the (n−1)-th power of two, and n is an integer greater than two; and
   rearranging the plurality of sub-sequences according to a predetermined pattern to form the video remix, wherein the video remix has a length corresponding to a multiple of the predetermined length.

17. The non-transitory computer-readable medium of claim 16, wherein the at least one excerpt begins at the at least one onset.

* * * * *